United States Patent [19]
Brenholt

[11] Patent Number: 4,661,039
[45] Date of Patent: Apr. 28, 1987

[54] FLEXIBLE-FRAME ROBOT
[75] Inventor: David L. Brenholt, Menomonie, Wis.
[73] Assignee: Donaldson Company, Minneapolis, Minn.
[21] Appl. No.: 779,224
[22] Filed: Sep. 23, 1985

Related U.S. Application Data
[63] Continuation of Ser. No. 543,752, Oct. 20, 1983, abandoned.

[51] Int. Cl.[4] .............................................. B25J 9/20
[52] U.S. Cl. .................................... 414/735; 364/513; 901/9; 901/22; 901/47
[58] Field of Search .................. 414/7, 739, 730, 735; 901/9, 14, 15, 21, 22, 25, 35, 46, 47; 364/513; 367/127; 356/5; 318/568

[56] References Cited
U.S. PATENT DOCUMENTS

| | | | |
|---|---|---|---|
| 2,545,452 | 3/1951 | Fletcher | 3/12 |
| 2,556,524 | 6/1951 | Drennon | 3/12 |
| 2,679,649 | 6/1954 | Alderson | 3/1.1 |
| 3,007,097 | 10/1961 | Shelly et al. | 901/47 X |
| 3,173,555 | 3/1965 | Kaye | 414/730 |
| 3,266,059 | 8/1966 | Stelle | 3/12.3 |
| 3,284,964 | 11/1966 | Saito | 901/21 X |
| 3,497,083 | 2/1970 | Anderson et al. | 414/738 |
| 3,654,613 | 4/1972 | Dunne et al. | 340/172.5 |
| 3,735,425 | 5/1973 | Hoshall et al. | 3/1.1 |
| 3,881,605 | 5/1975 | Grossman | 198/237 X |
| 3,909,600 | 9/1975 | Hohn | 235/151 |
| 4,107,948 | 8/1978 | Molaug | 64/2 P |
| 4,119,212 | 10/1978 | Flemming | 212/39 A X |
| 4,119,900 | 10/1978 | Kremnitz | 318/587 |
| 4,146,924 | 3/1979 | Birk et al. | 364/513 |
| 4,156,835 | 5/1979 | Whitney et al. | 318/561 |
| 4,246,661 | 1/1981 | Pinson | 3/1.1 |
| 4,260,187 | 4/1981 | Bejczy | 294/86 R |
| 4,287,459 | 9/1981 | Dahlstrom | 318/568 |
| 4,348,731 | 9/1982 | Kogawa | 364/513 |
| 4,357,672 | 11/1982 | Howells | 367/127 |
| 4,393,728 | 7/1983 | Larson et al. | 74/469 |

FOREIGN PATENT DOCUMENTS
1286821 8/1972 United Kingdom .

OTHER PUBLICATIONS
Pendar Robotics Ltd., Pendar Placemate brochure (undated).

Primary Examiner—Robert J. Spar
Assistant Examiner—Donald W. Underwood
Attorney, Agent, or Firm—Merchant, Gould, Smith, Edell, Welter and Schmidt

[57] ABSTRACT

An industrial robot (15) is disclosed which has a flexible frame or body and is constructed so as to have six degrees of freedom and a work envelope which is substantially free of dead spaces. A free end of the body includes an end effector (27) for performing a task. To determine the position of the end effector (27) within the work envelope and to displace the end effector (27) according to the task requirements, a system is provided in which embedded microprocessors are interconnected with a signal transmitter (ST) located at the body free end (23) and receivers (R1, R2, R3) fixed in their positions on the stationary base (16) of the body. Continual monitoring of the end effector location is possible and adjustment in position may be made immediately. A remote computer linked to the microprocessors provides instructions for the operation and displacement of the robot. The degrees of freedom for the body are movement about a vertical axis, a horizontal axis and within a plane oriented so as to be in-line with the vertical axis and perpendicular to the horizontal axis. Actuating mechanisms are provided for effecting movement of the flexible body either sequentially or simultaneously about the two axes and within the plane. Movement by the flexible body within the plane is accomplished hydraulically with bladder actuators positioned along the length of the segmented body and connected for fluid communication between each other.

8 Claims, 13 Drawing Figures

FLEXIBLE-FRAME ROBOT

This is a continuation of application Ser. No. 543,752, filed Oct. 20, 1983 now abandoned.

TECHNICAL FIELD

The present invention relates to machines capable of performing a task, e.g. manipulation of an object, which might otherwise typically be performed manually. More particularly, the present invention is a machine which is commonly termed a robot.

BACKGROUND

As defined by the Robot Institute of America, a robot may be a "reprogrammable, multifunctional manipulator designed to move materials, parts, tools, or specialized devices through variable programmed motions for the performance of a variety of tasks." To date virtually all robots have been constructed with rigid frames and the majority are servo-driven, either electrically or hydraulically.

The field of robotics is relatively undeveloped as a technology. Thus, problems continue to arise as attempts are made to apply state of the art robotic technology to increasingly demanding and sophisticated industrial applications. For example, certain applications require the robot to have variable load capabilities. Earlier designs and constructions for robots have not met this specific requirement or have done so unsatisfactorily and thus fail to meet the needs of the industry.

This particular problem with variable load capabilities might best be understood by way of example. When a rigidly framed robot is in a static position and performing a task, the load on the frame is subject to change if a transfer of material, e.g. a fluid, occurs from the robot to a separate apparatus or vice-versa. The transfer of the load causes a dynamic change in the robot's frame despite the static position of the robot itself. If the transfer of load is sufficiently significant, deflection occurs in the rigid frame, and thus the location of the joints of the frame in space will change. Proper performance of the task, however, is generally dependent upon the position of the robot in space. Without adequate feedback as to the dynamic changes occurring throughout the frame, the deflections cannot be compensated for and the position of the robot shifts, thereby jeopardizing the satisfactory performance of the task by the position-dependent robot. The use of the robot thus becomes questionable when it cannot be relied upon to complete the task as intended.

Performance of tasks which create dynamic changes in the frame of an otherwise static robot is an increasing requirement in many industries desiring to use robots. What is necessary then to insure an accurate and reliable performance on the part of the robot is a design and frame construction which can compensate for varying loads during the performance of a task. The present invention is intended to meet such requirements and is believed to advance the state of the art beyond the presently well-known rigid-frame models to a flexible-frame robot construction.

SUMMARY

The present invention is a robot whose flexible body or frame preferably has three degrees of freedom which define a hemispherical work envelope substantially free of dead spaces. A free end of the body contains a mechanism for effecting a task, e.g. manipulation of an object. Typically, the effecting mechanism may be a wrist and gripper arrangement having three degrees of freedom. To determine the position of the effecting mechanism within the work envelope, a system is provided which includes a signal transmitter which is located on the body proximate the effecting mechanism, and a plurality of signal receivers, spaced-apart in predetermined locations on a stationary base to which the robot body is operatively connected. A microprocessor, generally contained in the base, is interconnected to the signal transmitter and receivers in a manner allowing the transmission of signals therebetween to be monitored. The monitoring of the successive signals provides the data necessary for a pre-programmed algorithm to compute the position of the effecting mechanism within the work envelope at any given moment.

Determining the position of the effecting mechanism within the work envelope is an ongoing process along with that of displacing the robot body and effecting mechanism in order to accomplish the desired task. Mechanisms for displacing the robot body within the work envelope are also provided. Each degree of freedom involves a separate displacement mechanism, but each mechanism is interconnected with the microprocessor for coordination of the movements in accordance with the determinations made by the pre-programmed algorithm. A degree of freedom about a vertical axis and about a horizontal axis are provided in the robot of the present invention. However, not found in rigid-frame prior art robots is the third degree of freedom in the present invention which is movement within a plane oriented in space so as to be in-line with the vertical axis and perpendicular to the horizontal axis. The flexible design and construction of the robot frame or body makes this third degree of freedom possible. Combined with the system for determining the location of the effecting mechanism, the flexible body of the present invention reduces significantly the sources of error otherwise found in known prior art robots, particularly rigid-frame robots.

In the preferred embodiment of the present invention the flexible body is constructed of a number of separate, but interconnected, segmented members. The interseparate, connection of the members is accomplished by a pair of laminated springs and a pair of fluid passageways containing a plurality of bladder actuators spaced apart along the length of each passageway and within the individual body members. A mechanism, for transferring fluid between the two passageways to effect angular displacement of the body, is operatively connected to the microprocessor for receiving instructions as to the extent of fluid transfer necessary and the appropriate passageway to be filled or pressurized in order to effect the proper amount of displacement of the body. The robot body or frame is flexible in that there are no rigid joints or links as found in prior art models, and the body appears serpentine in its movement within the work envelope. However, the robot exists in two conditions, a first or flexible state during which displacement of the body occurs and a second or rigid state. When the fluid within the passageways is maintained at a given volume and further transfer is halted, the effecting mechanism is thereby positioned at a particular point in the work envelope and the robot body becomes rigid. This "frozen state" or rigidity of the flexible body is maintained until instructions for further displacement are provided.

If, as a result of a load transfer during the operation of the present invention, there is deflection in the body the position of the effecting mechanism can be corrected virtually instantaneously without adversely affecting the performance of the desired task. This is possible by ongoing computations as to the location of the effecting means in space via the generally constant monitoring of the signals being transmitted to the receivers in the stationary base. Thus, any deflection of the flexible frame or body caused by a change in the load being carried by the effecting mechanism can be accommodated in a period of time which is virtually unnoticed during the performance of the task by the robot.

As a result, the present invention provides the industry a reliable robot capable of performing sophisticated and demanding tasks accurately as a result of its ability to constantly adjust itself under adverse circumstances such as load changes arising during the performance of a task.

These and other advantages of the present invention will be disucssed further in the detailed description of a preferred embodiment of the present invention which follows.

DETAILED DESCRIPTION OF A PREFERRED EMBODIMENT OF THE PRESENT INVENTION

Figure 1:
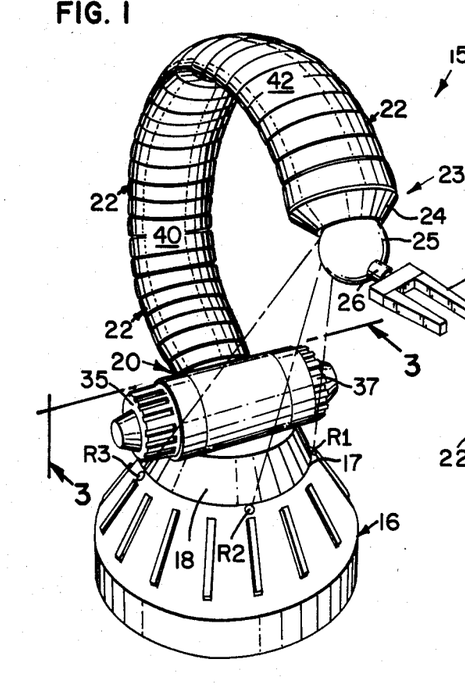
FIG. 1 is a perspective view of a preferred embodiment of the present invention as viewed from the front.
Figure 2:
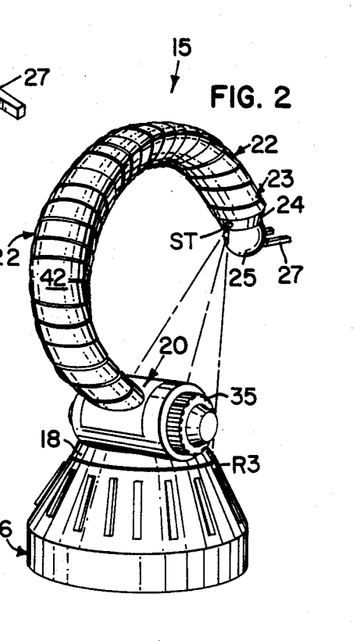
FIG. 2 is a perspective view of the embodiment of the present invention shown in FIG. 1 as generally viewed from the opposite side thereof.

Turning now to the drawings, the construction of a preferred embodiment of the present invention will be described. In FIGS. 1 and 2 perspective views of the robot 15 are shown. A stationary base 16 rests on a surface, e.g. a floor. In this embodiment, the base is given a generally frusto-conical shape. The interior of the base 16 is substantially hollow and housed therein are components to be described hereinafter. Mounted around the upper edge 17 of the stationary base 16 are a plurality of conventional ultrasonic receivers R1, R2, R3. Each receiver is spaced apart from the others a pre-determined distance. In this embodiment three receivers are used with two receivers R1, R3 positioned directly opposite each other on the base and a third receiver R2 being located midway therebetween. The receivers are of conventional construction and are commercially available.

Situated on top of the base and generally above the receivers is a rotatably movable portion 18 of the robot body. This portion 18 also is given a frusto-conical shape in the preferred embodiment and is designed so as to not interfere with the reception of transmitted signals by the receivers. In this portion a reservoir 19 for the fluid used in the displacement of the flexible body is located.

On top of the rotatably movable portion 18 are mechanisms for moving the robot specifically about a vertical axis and a horizontal axis. Such mechanisms are interconnected with the components contained in the stationary base and will be explained in further detail hereinafter.

Operatively connected to the base is a first end 20 of the flexible body of the present invention. As can be seen in FIGS. 1 and 2 the body or frame of the robot 15 is constructed of a series of aligned, individual members 22. The construction and design of the body allows a movement of the robot within a plane along various radii of curvature to be explained below. At the second or free end 23 of the flexible body a transition member 24 is provided which connects the body to a spherical ball 25 serving as a three-axis wrist for the robot. The wrist includes an extension 26 which mounts an end effector or gripper 27 which performs the task. Both the wrist 25 and the gripper 27 are of conventional construction and readily available commercially. Together the wrist and gripper comprise the effecting mechanism of the present invention.

To the rear of the effecting mechanism is positioned a transmitter ST for emitting a high-frequency signal, e.g., ultrasonic. In this embodiment the signal transmitter ST is mounted on the transition member 24 in a known location with respect to the wrist 25. As with the signal receivers R1, R2, R3, the signal transmitter ST is of conventional design and construction and is also readily available on the commercial market.

The primary visible features of the present invention thus include a stationary base, mechanisms for moving the robot body about a vertical axis and a horizontal axis, a flexible body allowing movement within a plane at various radii of curvature, a mechanism for effecting a task, a high frequency signal transmitter, and a plurality of receivers each of which is fixed in its location on the robot.

Figure 3:
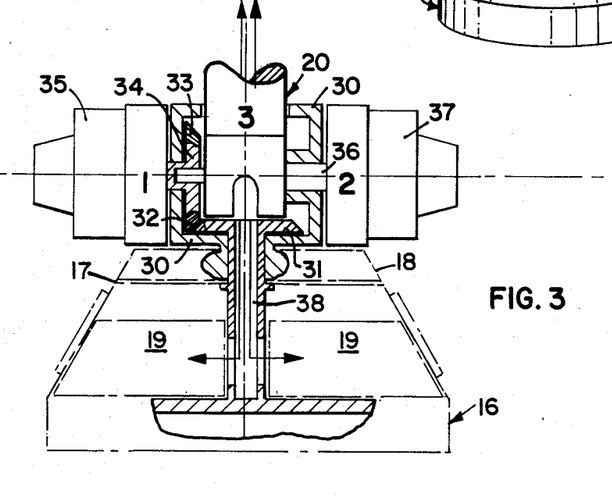
FIG. 3 is a cross-sectional view of the present invention as generally seen along lines 3—3 in FIG. 1.

Turning now to the specific construction of the robot and the arrangement of its components, FIG. 3 illustrates generally the preferred arrangement for the mechanisms used to move or displace the robot about a vertical axis and a horizontal axis. Housed within the stationary base 16 are the hydraulic power unit (not shown) and the computer-electronic control unit (not shown) for the robot. The hydraulic power unit includes a pump (not shown) which is operatively connected to the computer-electronic control unit for control of its operation. Both components are known in the art and the specific construction and interconnection of the components is believed known by those skilled in the art.

Within the rotatably movable portion 18 on top of the stationary base 16 is a reservoir 19 for the fluid used to displace the flexible body. Extending upward through this portion is a rigid structural member or frame 30 mounted at its lower end to a portion of the stationary base 16. The upper end of the frame provides the necessary surfaces for mounting the mechanisms for movement about the vertical and horizontal axes.

The preferred mechanism for movement of the robot about the vertical axis 1 is a bevel gear arrangement. A fixed bevel gear 31 is mounted to the structural member or frame 30 and includes a set of gear teeth 32 which mesh with the gear teeth 33 of an associated powered bevel gear 34 for movement of the rotatable portion about the vertical axis 1. Movement of the powered bevel gear 34 is effected by a rotary hydraulic actuator 35 situated above and to one side of the base as can be seen in FIGS. 1-3. The bevel gear arrangement and the actuator are all conventional components and commercially available.

The preferred mechanism for movement of the robot about the horizontal axis 2 includes a shaft 36 which is rotatably mounted in the frame 30 and connected at one end to a hydraulic rotary actuator 37. The actuator 37 is situated generally opposite the vertical axis actuator 35. These components are also of conventional construction and are commercially available.

Centrally located and extending through the mounting for the fixed bevel gear 31 is an access area 38 through which fluid may be transported to and from the flexible body and wiring from the computer-electronic control unit may be fed to the effecting mechanism and signal transmitter. The arrows shown in FIG. 3 indicate the two bi-directional flows of fluid used in the operation of the robot body.

Figures 4, 5, 6:
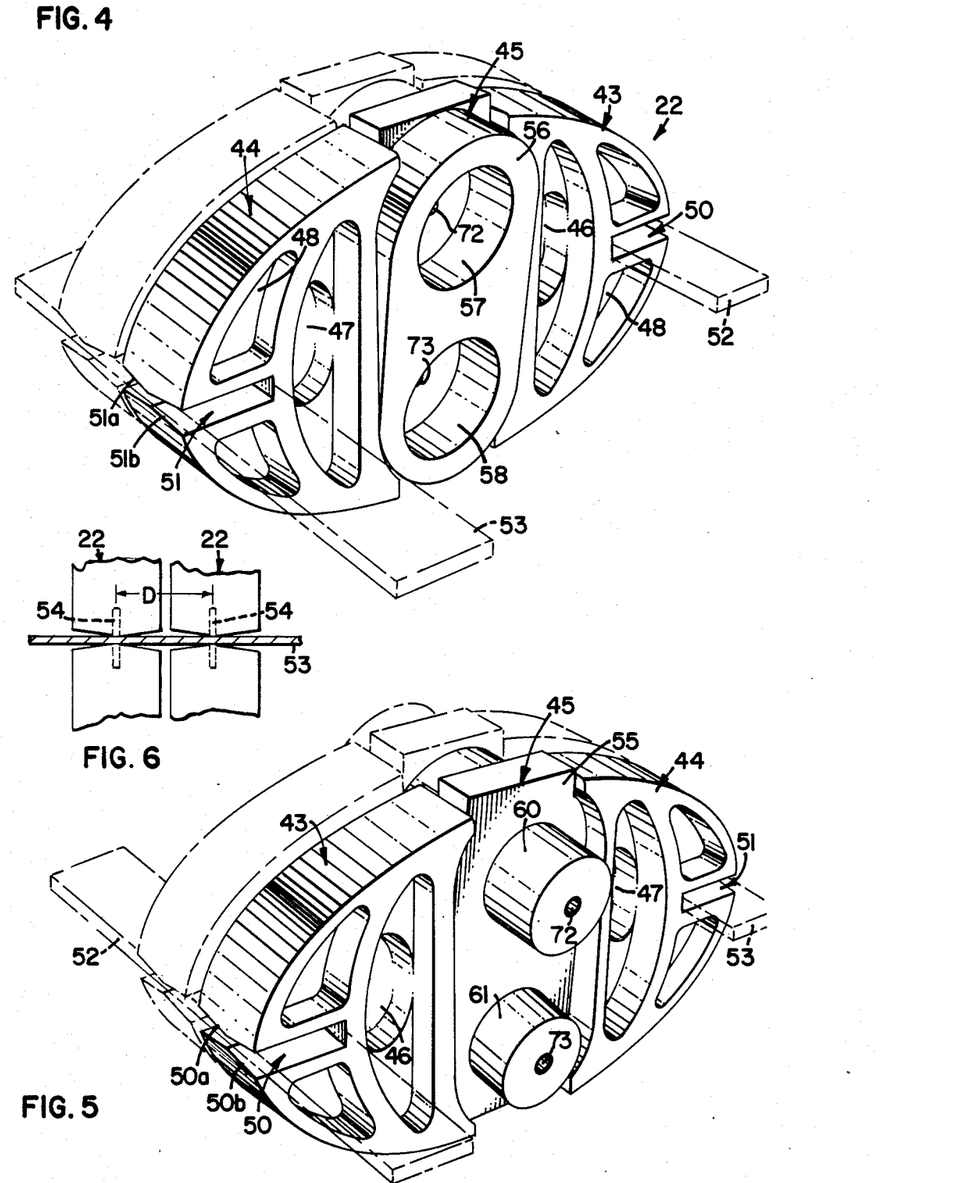
FIG. 4 is a perspective view of one of the segmented members of the flexible body of the present invention.
FIG. 5 is a perspective view of the member shown in FIG. 4 as viewed from the opposite side thereof.
FIG. 6 is a side elevational view of a portion of the member shown in FIG. 4.

To appreciate the preferred construction for the flexible body of the robot reference is now made to FIGS. 1 and 2 and 4-9. In FIGS. 1 and 2 it can be seen that the flexible body is comprised of a number of aligned, individual segmented members 22. For purposes of discussion a front side 40 and a back side 42 of the body are designated. Each body member 22 therefore, has a surface portion which faces the front side and a surface portion which faces the back side of the body. See FIGS. 1 and 7. Each body member 22 in the preferred embodiment is made from a molded plastic, preferably polyester. Each member 22 includes three separate segments arranged together to define a forward or front face as shown in FIG. 4 and a second face, also described as a rearward or back face, as shown in FIG. 5. Only one member is shown in the drawings as the construction for the remaining members is substantially identical thereto.

Figure 7:
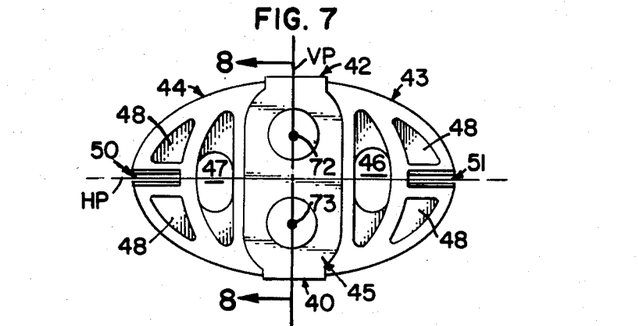
FIG. 7 is a front elevational view of the member shown in FIG. 4.

As can be seen in FIGS. 4, 5, and 7 each member has a first end segment 43 and a second end segment 44 of substantially identical construction. Situated therebetween is a third or middle segment 45. The three segments 43,44,45 are fitted together by tongue and groove connections at their contacting surfaces. The overall shape of the member in the preferred embodiment is generally oval or elliptical but the invention is not limited to this particular shape.

Each of the end segments 43,44 has a portion with an opening 46,47 respectively extending therethrough. When all of the members are aligned with respect to each other the aligned openings 46,47 form a pair of channels, each extending through the length of the robot body, which serve as access ports for feeding electrical wiring therethrough from the base 16 to the effecting mechanism 25,26,27. Cavities 48 in the remaining portions of the end segments 43,44 are provided to reduce the weight of the molded plastic member.

For the purpose of this description it is assumed each member 22 has a vertical plane VP extending therethrough and a horizontal plane HP extending therethrough. See FIG. 7. Situated on the horizontal plane HP at the outside edges of both the first and second end segments 43,44 are portions having an open-ended slot 50,51 respectively extending therethrough. See FIGS. 4, 5 and 7. Each of the slots 50,51 are aligned with the corresponding slots of the members on both sides thereof, and thus form a pair of slotted passageways at opposite sides and along the entire length of the robot body. Within each slotted passageway 50,51 a laminated fiberglass spring 52,53 respectively is secured so as to extend from the lower first end 20 of the body to the transition member 24 at the free, upper end of the body. As can be seen in FIG. 6 each spring 53 is secured at locations along its length to each of the members 22. In the preferred embodiment a combination of pins 54 and adhesive bonding with a polyester resin are used to fix the spring's position relative to the respective member. It can be seen in FIGS. 4-6 that the surfaces 50a,50b, 51a,51b of each member which define a respective slotted opening 50,51 are bevelled in a direction away from the respective spring 52,53 positioned therebetween. This is done in order to allow the spring to flex along various radii of curvature without being obstructed by the presence of the body members. It can also be appreciated from a view of FIG. 6 that there is a fixed distance D between the associated pins of adjacent members 22. This fixed distance is common between adjacent members 22 throughout the length of the body, and it is within this fixed distance that flexure of the spring, and hence the body, occurs.

The middle or third segment 45 of each member 22 is constructed of two parts, i.e. a molded piston section 55 and a molded cover section 56. See FIGS. 8 and 9. It is through the aligned middle segments 45 of the flexible body that the fluid is transported and contained for effecting and maintaining displacement of the body along the various radii of curvature within the plane 3. Each middle segment 45 has a cover section 56 which receives or mates with the piston section 55 of an adjacent member. This mating of members 22 is illustrated by phantom lines in FIGS. 4 and 5 and may be appreciated more fully in the cross-sectional views of FIGS. 8 and 9. Each cover section 56 in the preferred embodiment has a generally elongated oval shape with a pair of generally circular openings 57,58 formed therein. A first circular opening 57 is formed in the upper portion of the segment 45 and defines a first channel or recessed area having a depth and diameter substantially equal to the height and diameter of the respective piston portion to which it mates. A second circular opening 58 is formed, in-line with the first opening 57, in the bottom portion of the segment and defines a second channel or recessed area substantially equal in size to the first channel. The thickness of the segment 45 is greater at its upper half than at its bottom half. See FIGS. 8 and 9.

Figure 8:
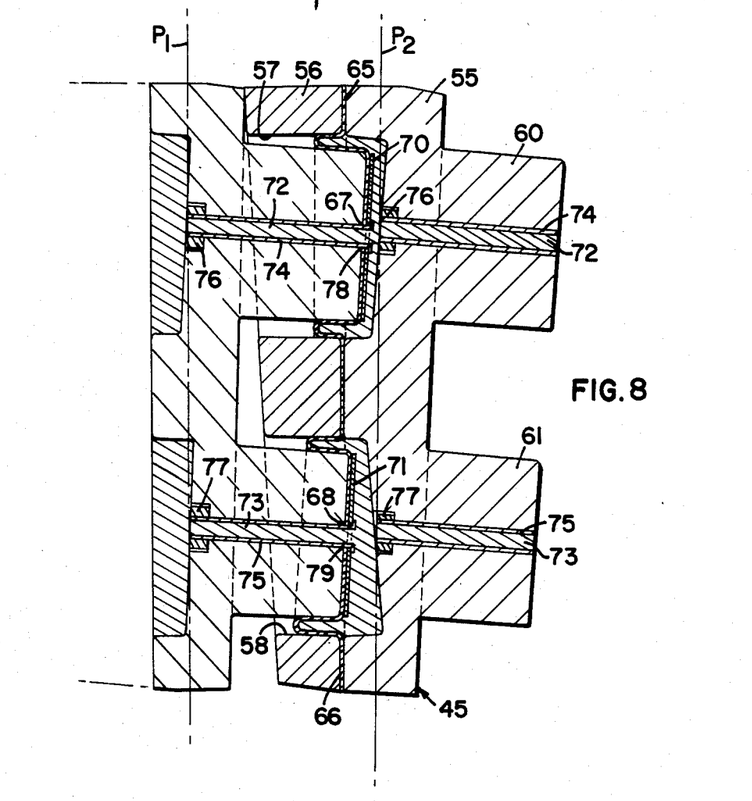
FIG. 8 is a cross-sectional view of a portion of the body as seen generally along lines 8—8 in FIG. 7.
Figure 9:
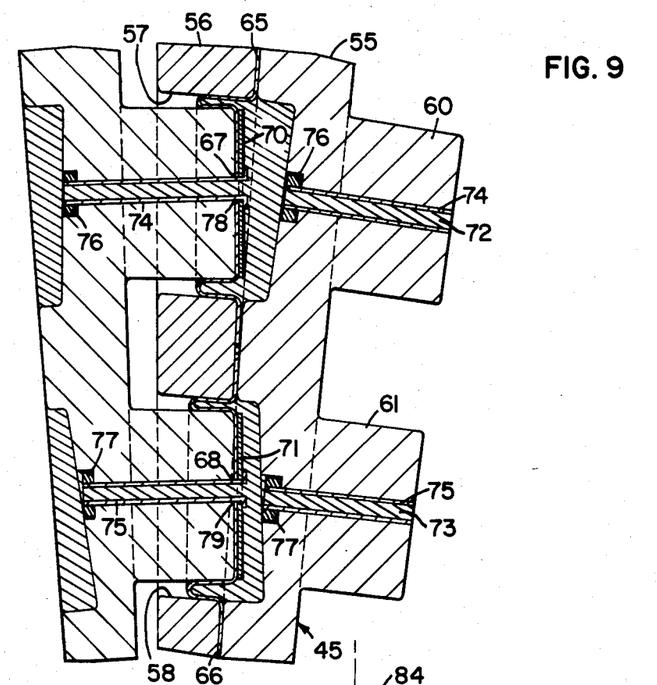
FIG. 9 is a cross-sectional view of a portion of the body as displaced relative to that shown in FIG. 8.

The piston section 55 of the segment 45 has a first portion which is generally rectangular in shape and has a greater thickness at its top end than at its bottom end in the preferred embodiment. Extending outward from the side of the piston rectangular portion, opposite the side facing the cover section, are a pair of plugs each having a generally circular cross-section. A first plug 60 extends from the upper half of the section substantially equal in size to and in-line with the location of the first opening 57 in the cover section 56. A second plug 61 extends from the lower half of the section 45 substantially equal in size to and in line with the location of the second opening 58 in the corresponding cover section 56. Each plug 60,61 has a centrally located opening extending completely through the thickness of the plug. These openings allow fluid communication between adjacent segments.

The two sections 55,56 of the middle segment 45 are secured together in a suitable manner using suitable fasteners to form a one-piece segment. To connect the series of members 22 together in the aligned manner shown in FIGS. 1 and 2, a conventional bladder diaphragm or actuator 65,66 is positioned between each opening 57,58 in the cover section 56 and the corresponding plug 60,61 of the piston section 55 which mates therewith. See FIGS. 8 and 9. The bladder diaphragms selected for use in the present invention are of conventional manufacture and are commercially available. Each bladder diaphragm 65,66 has a centrally located opening 67,68 respectively which is aligned with the openings in the respective piston plug 60,61. A metal back-up disk 70,71 is provided to prevent movement of the respective diaphragm relative to the associated plug when fluid is being transferred.

As can be seen in FIGS. 8 and 9 the openings which extend through each piston section plug define a fluid passageway 72,73 respectively which places that piston section in fluid communication with the fluid passageway of the adjacent member on either side thereof. In the preferred embodiment an assembly tube 74,75 and lock nut 76,77 are used to secure the tube within the respective plug passageway 72,73. The free end of the tube 78,79, i.e. that end opposite the end bearing the locknut, may be bent outward to seal the area between the bladder opening 67,68, the metal back-up disk 70,71, and the tube 74,75 respectively. See FIGS. 8 and 9. The metal disk may also be soldered at this location to the end of the assembly tube. The tube and lock nut arrangement seal the diaphragm to the piston. The succession of tubes extending through the aligned upper and lower portions of the middle segments "tie" the members together for the transfer of fluid therethrough. Additionally, the tube and lock nut arrangements assist in preventing angular misalignment from occurring between the members. Each bladder diaphragm or actuator 65,66 is form fitted to the shape of the piston section plug to provide a sealed, fluid-containing area in the central part of each middle segment. The volume of the area containing the fluid is determined by the amount of flexure desired for the body, e.g. the less the curvature. of the body, the less volume will be found in the bladder diaphragms along the top side 42 of the body, and a greater volume in the diaphragms along the lower side 40 of the body. See FIG. 8. If curvature is increased, the volume of the bladder actuator area for containing fluid is increased for the bladder actuators along the top side 42 of the body, and decreased for the bladder actuators along the lower side 40 of the body. See FIG. 9. This will be discussed further in the operation of the invention. It can be appreciated from a view of FIG. 8 that at maximum or full extension of the body the planes P1,P2 through the respective locknuts are substantially parallel indicating the body would be substantially straight or without significant curvature.

The wrist 25 of the effecting mechanism is secured within the transition member 24 and connected by appropriate wiring to the control units in the base. An extension 26 on the spherical outer surface of the wrist provides a mounting for the placement of a gripper 27 thereon which is capable of performing a given task. The three axes about which the effecting mechanism can operate are the known axes in the prior art described as pitch, Axis 4; roll, Axis 6; and yaw, Axis 5. See FIG. 11.

In the base of the robot a conventional, fixed-displacement pump (not shown) is provided which allows fluid to be transferred at the lower end 20 of the body from one series of passageways 72 into the other series of passageways 73. An associated valve (not shown) is positioned in the fluid line between the pump and the passageways to control the transfer of the fluid and thus control the displacement of the body within the body's third degree of freedom, plane 3. Each series of passageways is closed at the free end 23 of the body. Thus transfer of fluid from the top side 42 of the robot to the under side 40 occurs only at the lower end 20 of the robot.

The on-board microprocessors (not shown), those housed in the robot itself, consist of commercially available hardware such as the INTEL 8048 family of 8-bit processors. Overall user programming control may be a remotely located 16-bit computer (not shown) linked to the microprocessors.

In the preferred embodiment of the present invention four microprocessors are used. The first microprocessor would determine position based on the data provided by the ultrasonic triangulation hardware ST, R1, R2, R3. The second would provide axis control and coordination for the body's axis 1, axis 2, and plane 3. The third would provide axis control and transformation for the wrist axes 4, 5 and 6. The fourth microprocessor would provide integration of the three microprocessors and communicating procedures with the 16-bit computer.

Figure 11:
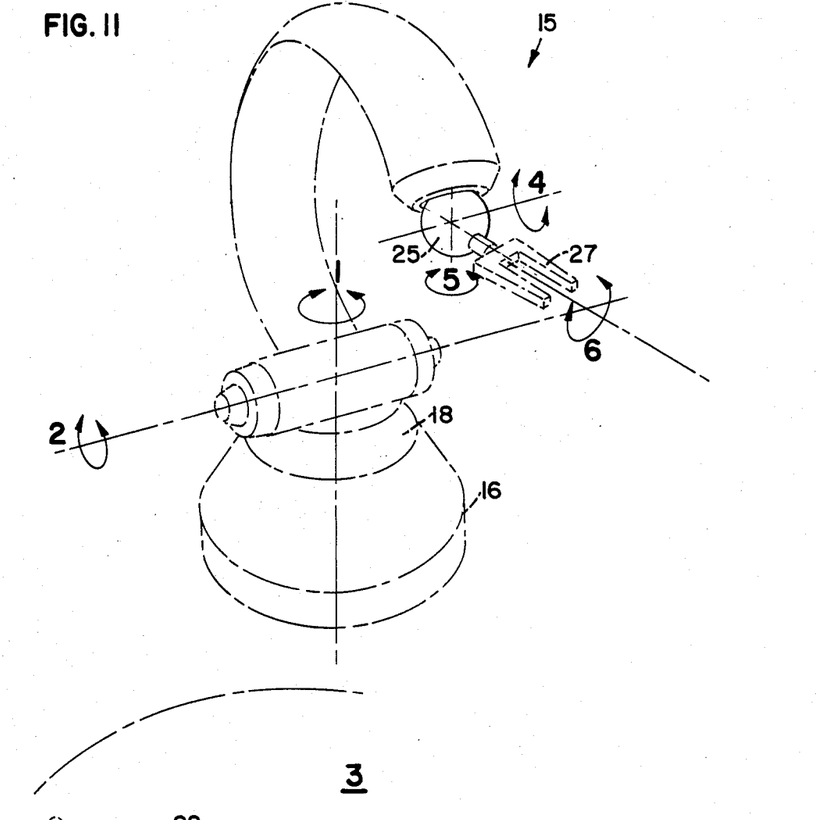
FIG. 11 is a schematic diagram illustrating the six freedoms of movement of the preferred embodiment of the present invention.
Figure 12:
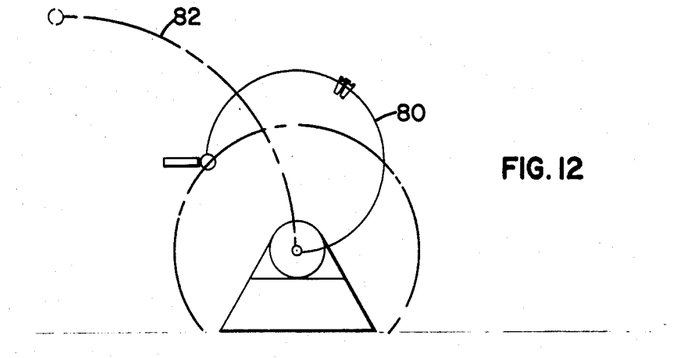
FIG. 12 is a schematic diagram illustrating two possible positions of the present invention within the work envelope.

In FIG. 11 the six freedoms of movement of the preferred embodiment of the present invention are indicated. For the flexible body, movement is possible about a first axis 1, which is a vertical axis; a second axis 2, which is a horizontal axis; and within a plane 3 which is oriented inline with the vertical axis and perpendicular to the horizontal axis. Movement of the body within the plane 3 can be appreciated from FIG. 12 in which the body is schematically shown in two possible positions. The first position 80 shows the body at its maximum curvature within the plane 3. In this position the body is curled in upon itself to the greatest degree possible with the construction of the preferred embodiment of the body members. The radius of curvature for this position defines an arc of approximately 270 degrees. In contrast the second position 82 of the body in FIG. 12 illustrates one radius of curvature in which the body is flexed outwardly towards the outer limits of the work envelope.

Figure 10:
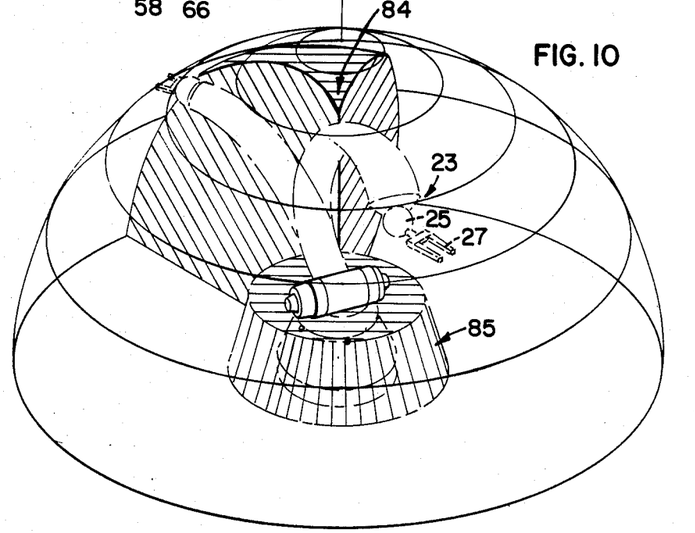
FIG. 10 is an isometric view of the work envelope of the present invention.

In FIG. 10 the work envelope is isometrically illustrated. The envelope is defined by the outer limits of reach for the effecting mechanism as the body is displaced about the vertical and horizontal axes and within the plane 3. As can be appreciated the work envelope is substantially without dead spaces. The areas not capable of reach with the construction of the preferred embodiment are the area 84 immediately to the rear of the body behind the signal receivers and the area 85 directly below the body which exceeds the maximum radius of curvature. Nonetheless, the flexible frame robot of the present invention allows for a significantly increased work envelope generally not found in the prior art.

The remaining three degrees of freedom for the robot are possible through the conventional wrist. The three are pitch, axis 4, allowing up and down movement; yaw, axis 5, providing side-to-side movement, and roll, axis 6, allowing movement of the gripper in a circular motion. These are common degrees of freedom known in the prior art and possible with conventional wrists and grippers as selected for the present invention.

OPERATION OF THE PRESENT INVENTION

Figure 13:
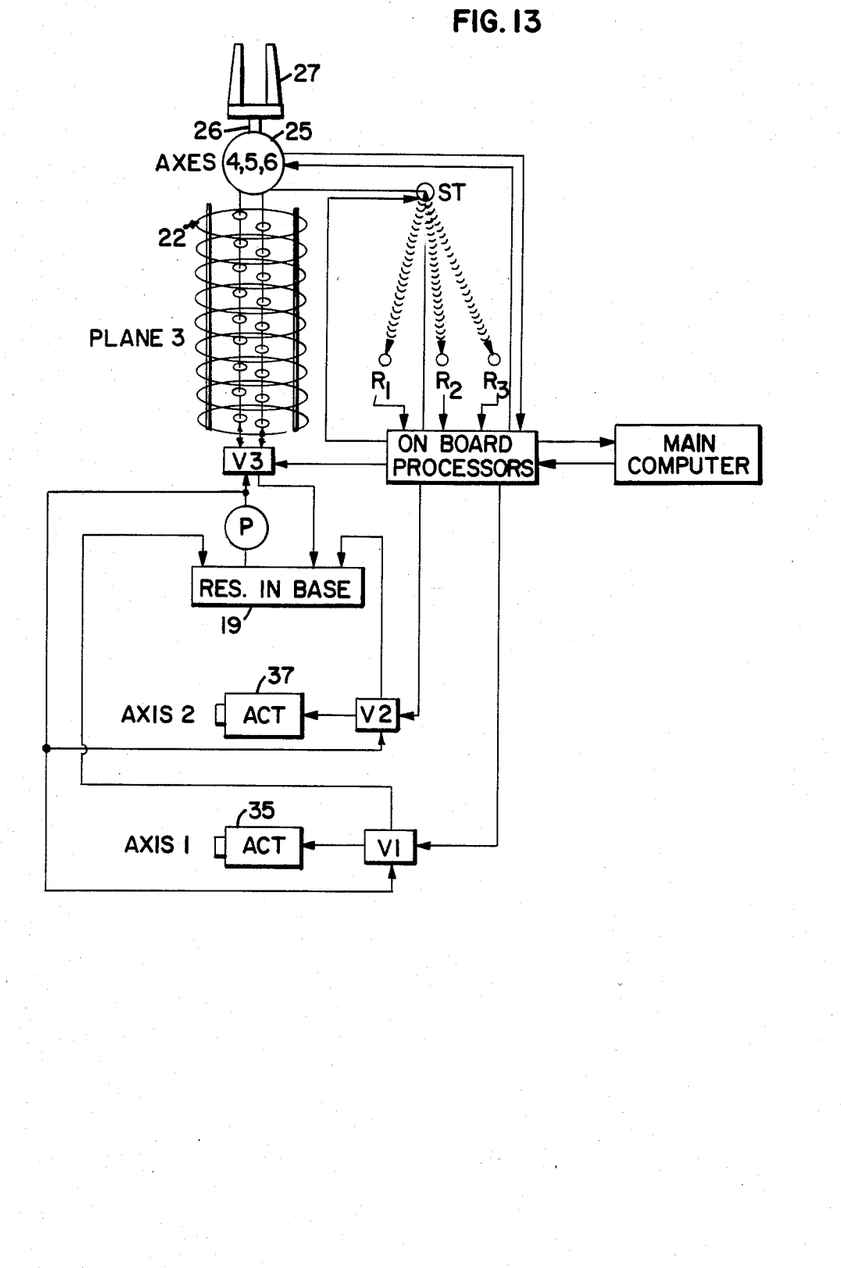
FIG. 13 is a schematic diagram illustrating the interconnection of the basic operational components of the present invention.

Turning now to FIG. 13 the operation of the invention can be appreciated. To achieve the desired operating capabilities of any robot, the position of its effecting mechanism, e.g. gripper device 27, at any given moment must be known and displacement of the mechanism to a desired position must be possible. In prior art robots the use of rigid links and pivot points required individual position feedback devices for each pivot point in order to determine the position of the end effector and move the individual links to reposition the end effector as necessary to perform the given task. Each link, pivot point, joint, etc. is a source of error in that the mechanical parts are subject to wear. Further, deflection of a portion of the robot body due to a change in load capacity presented additional calculation problems. Thus, over time and during the performance of any task involving load transfers the reliability of the robot could not be insured. The present invention is believed to eliminate these problems with its unique combination of a ranging system for determining the location of the wrist point and a flexible body not requiring individual feedback points for any portion thereof.

As described earlier, the ultrasonic transmitter ST is located on the robot 15 at a fixed position relative to the wrist point 25 carrying the gripper or end effector 27. The transmitter ST is operated such that when a signal is emitted a clock or timer (not shown) is started. When each receiver R1, R2, R3 has received the transmitted signal or pulse the clock is stopped. In the preferred embodiment, the three different time delays for receiving the emitted signal become data inputs for the computer processor of the invention. Each of the time delays is then converted by the computer into a distance value. With the three distance values, standard triangulation calculations can be performed to determine the one point in the work envelope where the wrist point 25 is located at that given moment. Subsequently emitted signals yielding different time delays, and hence distance values, immediately represent a new point or location of the wrist point 25 in the work envelope. The new values are used by the computer processors of the invention to determine the best displacement moves for the body in order to reposition the wrist point to the desired location in the work envelope. With the triangulation method for calculating the location of the wrist point, there is no need to determine the body's radius of curvature at any given time as such is not important for relocating the end effector for the performance of the desired task.

The advantage found with the use of the flexible body of the present invention is its ability to be "hydraulically frozen" in a given position in order to maintain the wrist point 25 at a given location within the work envelope, and thus it momentarily becomes a rigid body. Normally varying loads would cause serious deflection problems in a rigid robot frame and consequent problems with calculating the location of that robot's end effector; however, the present invention continues to satisfactorily perform the desired task as its wrist point location is continually being monitored and, if necessary repositioned via a displacement of the flexible body in accordance with commands received from the invention's computer.

In the present embodiment a single computer could be used to accomplish the signal monitoring, distance calculations, and giving of instructions necessary to operate the robot. However, it has been found that the use of on-board dedicated microprocessors for each function of the robot is desirable. Such microprocessors serve to interface the controls of the robot with the various functions to be performed. Each microprocessor is provided a fixed program for the performance of its particular function. A control program is then provided which communicates data between the dedicated processors and a user program specifically designed for a particular job application. A main computer, separate from the on-board dedicated processors, is thus used in the preferred embodiment.

The overall, most significant advantage of the present invention from the prior art robots is the elimination of all but one source of error. In the present invention the only source of error with respect to properly positioning the wrist point is the ranging system with its one signal emitter and three receivers. This is a significant advance in the state of the art in that the robot of the present invention is more reliable and performs more accurately any task performed by rigid frame robots. Further, the software required by the present invention is simplified given the straightforward, single triangulation calculations performed for each emitted signal. The instructions provided the various components for displacement of the body are accordingly simplified as a result of the construction of the flexible body by the fact that the radius of curvature of the body need not be calculated in order to reposition the wrist point where desired.

To displace the body and hence reposition the wrist point the on-board processors are electrically connected to the associated valves V provided to control the operation of each actuator for the robot. In FIG. 13 it can be seen that the on-board processor instructs each of the individual valves associated with displacement about axis 1, axis 2, and plane 3. Depending upon the calculations performed by the computer, all three degrees of freedom, any combination of the three, or any single degree of freedom can be actuated sequentially or simultaneously in order to reposition the wrist point via displacement of the body. For example, to displace the body about the vertical axis, axis 1, a signal is sent to the valve V1 controlling the flow of fluid into the associated rotary-hydraulic actuator 35. Powering the actuator 35 for movement of the bevel gear arrangement is controlled through the instructions received from a particular dedicated on-board processor. As the powered bevel gear interacts with the fixed bevel gear the robot is moved about the vertical axis within the work envelope. As this movement occurs it is continually monitored via the emitted signals of the ranging system. When the desired repositioning of the wrist point is accomplished, the respective dedicated processor will terminate the operation of the associated vertical axis actuator and movement about the axis will cease.

If movement about the horizontal axis 2 is desired, the corresponding dedicated processor instructs the associated valve V2 and actuator 37 to operate. When sufficient movement about the horizontal axis is accomplished the operation will cease with the termination of signals from the respective dedicated processor.

Movement within the plane 3 is, however, more complex given the construction of the segmented flexible body. This degree of freedom of the present invention allows the robot complete operation at any location within its work envelope as a result of its body being able to "curl" through various radii of curvature within the plane 3. To move the body within the plane it is necessary to transfer fluid, e.g. hydraulic oil, between the two fluid passageways 72,73 of the body. One of the passageways 73 controls the curl of the underside 40 of the body while the other passageway 72 controls the curl along the top side 42 of the body. Thus, in FIG. 13, it can be appreciated that instructions directed to the associated valve V3 of the body must indicate the extent to which fluid must be pumped or transferred between the two passageways 72,73. As fluid is transferred between the two passageways 72,73, whether to equalize the fluid volume therebetween for maximum extension or to vary the volumes to achieve different radii of curvature or curl, the fluid flows from one bladder diaphragm in the particular passageway to the next. As fluid is removed from a passageway, for example the upper or top side passageway 72, it is transferred into the other passageway 73 at the lower end of the body and the body is flexed outwardly in a manner illustrated in FIG. 8. If fluid transfer is from the lower passageway 73 to the upper passageway 72 the body curls in upon itself as shown in FIG. 9 and illustrated in the perspective views of FIGS. 1 and 2. When the body has curled or uncurled to the extent necessary to place the wrist point in the desired location within the plane 3 as determined by the ranging system, the respective dedicated processor will cease the fluid transfer and the fluid volumes in each passageway will be held constant. At that point the body is temporarily rigid or "hydraulically frozen" until the next set of instructions is received for displacing the body within plane 3, as there is no transfer of fluid between the passageways.

As can be seen from FIG. 13 a single pump P is used in the preferred embodiment to pump any necessary additional fluid from the reservoir 19 to the valves or to withdraw fluid from the valves. In the preferred embodiment, the fluid volume within the body's passageways remains substantially constant and the reservoir serves merely as a container for overflow of fluid from the two passageways.

The remaining three degrees of freedom, about axes 4, 5 and 6, provided by the conventional wrist and gripper are controlled electrically through signals provided by the associated dedicated processors.

The present invention's reliance on emitted signals for the ranging system may require a system to compensate for changes in the ambient temperatures which would affect the velocity or speed at which the signals travel. For example, as the temperature of the ambient environment increases so does the velocity at which the signal travels through that environment. One compensation system which may be used includes the use of a fixed fourth point of reference on the robot. This fourth point may be a receiver located on the body near the wrist point. When the receiver is at a known and fixed distance from the wrist point the time delay for the signal to be received by the fourth receiver serves as a correction factor and can thus be used to "adjust" the computations involved with the triangulation calculations to compensate for variations in the ambient temperature, which otherwise would not be automatically compensated for by the invention's software. Such a compensation system insures the continued reliable operation and accurate displacement of the robot of the present invention.

What is claimed is:

1. A flexible-frame robot, comprising:
 a base;
 a segmented body having one end secured to said base;
 said body including a plurality of aligned members, each member including a pair of end segments and a middle segment;
 an opposite pair of springs interconnecting corresponding adjacent end segments of the members of said body;
 the middle segment of each member including mating piston and cover sections, the piston section including an opposite pair of openings oriented transverse to said pair of springs;
 a pair of bladder diaphragms disposed between adjacent middle segments of the members of said body, each diaphragm being in fluid communication through the corresponding openings in the piston sections thereof to define two passageways adapted for connection at said one end of said body to a source of fluid under pressure, whereby angular displacement of said body can be controlled as desired; and
 means connected to the other end of said body for gripping an object.

2. The flexible-frame robot of claim 1, wherein said springs extend through longitudinal slots in the end segments of the members of said body, opposite ends of each slot being beveled outwardly in opposite directions from each member, and further including:
 a connecting pin extending transverse to each spring through the slot in each end segment of the members of said body.

3. The flexible-frame robot according to claim 1, wherein said springs are comprised of laminated fiberglass.

4. The flexible-frame robot of claim 1, wherein one of the piston and cover sections are oriented toward said base and the other of the piston and cover sections of the middle segments of said body members are oriented toward said gripping means, and wherein each piston section includes a back surface, and wherein each cover section includes a front surface, and further including:
 a pair of spaced apart plugs extending from the back surface of each piston section, said fluid openings extending through said plugs which are received in corresponding openings formed through the cover section of each middle segment of each body member.

5. The flexible-frame robot according to claim 4, wherein the front surface of each cover section is angled and extends in a plane transverse to said pair of springs so that the thickness of said cover section is greater at its upper half than its bottom half.

6. The flexible-frame robot of claim 1, further including:

means for supporting the one end of said segmented body on said base for rotation about an vertical axis.

7. The flexible-frame robot of claim 1, further including:
means for supporting the one end of said segmented body on said base for rotation about a horizontal axis.

8. A flexible-frame robot, comprising:
a base;
a segmented body having opposite inner and outer ends;
means for supporting the inner end of said body on said base for independent rotation about mutually perpendicular axes;
said body including a plurality of aligned members, each member including a pair of end segments and a middle segment;
a pair of opposing springs interconnecting corresponding adjacent end segments of the body members;
the middle segment of each body member including mating piston and cover sections, with each piston section including a spaced apart pair of fluid openings extending therethrough and transverse to said pair of springs and in alignment with the corresponding openings in the piston sections of the middle segments of the adjacent aligned body members;
each cover section including an angled front surface extending in a plane transverse to said pair of springs so that the thickness of said cover section is greater at one side thereof;
a pair of bladder diaphragms disposed between adjacent middle segments of the members of said body, each diaphragm being in fluid communication through the corresponding fluid openings in the piston sections thereof to define two passageways extending through said body and adapted for connection at the one end of said body to a source of fluid under pressure, whereby curvature of said body can be controlled as desired; and
means connected to the other end of said body for gripping an object.

* * * * *